(12) United States Patent
Zhang et al.

(10) Patent No.: US 11,246,050 B2
(45) Date of Patent: Feb. 8, 2022

(54) METHOD FOR TRANSMITTING UPLINK MEASUREMENT REFERENCE SIGNAL, APPARATUS, AND SYSTEM

(71) Applicant: HUAWEI TECHNOLOGIES CO., LTD., Guangdong (CN)

(72) Inventors: Leiming Zhang, Beijing (CN); Jianghua Liu, Beijing (CN); Yifan Liu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 49 days.

(21) Appl. No.: 16/452,892

(22) Filed: Jun. 26, 2019

(65) Prior Publication Data
US 2019/0320338 A1  Oct. 17, 2019

Related U.S. Application Data

(63) Continuation of application No. PCT/CN2017/114476, filed on Dec. 4, 2017.

(30) Foreign Application Priority Data

Dec. 30, 2016 (CN) .......................... 201611265950.2

(51) Int. Cl.
*H04W 24/10* (2009.01)
*H04B 17/336* (2015.01)
(Continued)

(52) U.S. Cl.
CPC .......... *H04W 24/10* (2013.01); *H04B 7/0456* (2013.01); *H04B 7/0617* (2013.01);
(Continued)

(58) Field of Classification Search
None
See application file for complete search history.

(56) References Cited

U.S. PATENT DOCUMENTS 8,467,363 B2   6/2013 Lea et al.
10,693,522 B1*  6/2020 Kim .......................... H04B 1/71
(Continued)

FOREIGN PATENT DOCUMENTS

CN   101572896 A   11/2009
CN   101674655 A    3/2010
(Continued)

OTHER PUBLICATIONS

Mitsubishi Electric,"Exploiting channel reciprocity in TDD/MIMO with asymmetric interference",3GPP TSG RAN WG1 #56bis meeting,R1-091144,Seoul, Korea, Mar. 23-27, 2009, total 6 pages.
(Continued)

*Primary Examiner* — Faruk Hamza
*Assistant Examiner* — Cassandra L Decker
(74) *Attorney, Agent, or Firm* — Womble Bond Dickinson (US) LLP

(57) ABSTRACT

The present disclosure discloses a method for transmitting an uplink measurement reference signal. The method is applied to a network-side device and includes the following operations: first, receiving, by the network-side device, an uplink measurement reference signal sent by user equipment, where the uplink measurement reference signal carries downlink interference information of a downlink channel of the network-side device; and then, performing downlink interference estimation on the uplink measurement reference signal, to obtain the downlink interference information. Compared with the prior art in which a base station cannot obtain downlink interference information of a downlink channel used by user equipment, in the present disclosure, the network-side device can effectively schedule the user equipment based on the downlink interference information, thereby improving scheduling efficiency, and improving data transmission efficiency of the downlink channel.

13 Claims, 4 Drawing Sheets

(51) Int. Cl.
    *H04B 7/0456* (2017.01)
    *H04L 5/00* (2006.01)
    *H04B 7/06* (2006.01)
    *H04W 72/04* (2009.01)
    *H04W 88/02* (2009.01)
(52) U.S. Cl.
    CPC ......... *H04B 17/336* (2015.01); *H04L 5/0051* (2013.01); *H04W 72/046* (2013.01); *H04W 88/02* (2013.01)

(56) References Cited

U.S. PATENT DOCUMENTS

| | | | |
|---|---|---|---|
| 2011/0058505 | A1 | 3/2011 | Pan et al. |
| 2011/0098054 | A1* | 4/2011 | Gorokhov ............. H04L 5/0035 455/452.1 |
| 2015/0223174 | A1 | 8/2015 | Larsson et al. |
| 2016/0270087 | A1* | 9/2016 | Soriaga ................ H04B 7/0626 |
| 2017/0201300 | A1* | 7/2017 | Parkvall ............ H04W 36/0005 |
| 2017/0366311 | A1* | 12/2017 | Iyer ........................ H04L 5/0007 |
| 2018/0041258 | A1* | 2/2018 | Tong .......................... H04L 1/06 |
| 2018/0091274 | A1* | 3/2018 | Islam .................. H04W 72/046 |
| 2018/0097595 | A1* | 4/2018 | Huang .................. H04L 5/0037 |
| 2018/0102823 | A1 | 4/2018 | Sun et al. |
| 2018/0146433 | A1* | 5/2018 | Zhang ............... H04W 52/146 |
| 2019/0190569 | A1* | 6/2019 | Nayeb Nazar ....... H04B 7/0639 |
| 2020/0067581 | A1* | 2/2020 | Osawa ................ H04W 72/046 |

FOREIGN PATENT DOCUMENTS

| | | |
|---|---|---|
| CN | 102469613 A | 5/2012 |
| CN | 102684835 A | 9/2012 |
| CN | 102858005 A | 1/2013 |
| CN | 103052161 A | 4/2013 |
| CN | 103095400 A | 5/2013 |
| EP | 2663150 A1 | 11/2013 |
| JP | 2016500982 A | 1/2016 |

OTHER PUBLICATIONS

Mitsubishi Electric,"Discussion on Precoded SRS",3GPP TSG RAN WG1 #57bis meeting,R1-092441,Los Angeles, USA, Jun. 29-Jul. 3, 2009, total 6 pages.

Qualcomm Incorporated,"Views on RS for CSI acquisition",3GPP TSG-RAN WG1 #86bis,R1-1610151,Oct. 10-14, 2016, Lisbon, Portugal, total 5 pages.

Huawei:"Channel state information feedback for the advanced antenna technologies in LTE-A", 3GPP Draft; R1-091283, vol. RAN WG1, No. Seoul, Korea, Mar. 17, 2009, 2 pages.

Samsung:"Discussions on tradeoff of CS!-RS and feedback enhancement", 3GPP Draft; R1-152882, vol. RAN WG1, No. Fukuoka Japan, May 24, 2015. 6 pages.

* cited by examiner

METHOD FOR TRANSMITTING UPLINK MEASUREMENT REFERENCE SIGNAL, APPARATUS, AND SYSTEM

CROSS-REFERENCE TO RELATED APPLICATIONS

This application is a continuation of International Application No. PCT/CN2017/114476, filed on Dec. 4, 2017, which claims priority to Chinese Patent Application No. 201611265950.2, filed on Dec. 30, 2016, The disclosures of the aforementioned applications are hereby incorporated by reference in their entireties.

TECHNICAL FIELD

The present disclosure relates to the field of wireless communications technologies, and in particular, to a method, system and apparatus for transmitting an uplink measurement reference signal.

BACKGROUND

A radio channel is a data signal transmission channel using a radio signal as a transmission medium. In the field of wireless communications, there is reciprocity between an uplink (a direction from user equipment to a base station) channel and a downlink (a direction from the base station to the user equipment) channel in a same frequency band. To be specific, an uplink channel matrix is the conjugate transpose of a downlink channel matrix.

In a communications system in the prior art, a base station usually obtains an uplink channel matrix by using an uplink measurement reference signal received from user equipment, and then, obtains a downlink channel matrix through calculation by using the foregoing reciprocity. The base station then schedules the user equipment based on the downlink channel matrix and sends downlink data.

However, when receiving the downlink data, the user equipment is affected by interference from surrounding signals and thermal noise of the user equipment. In the prior art, the downlink channel matrix obtained by the base station cannot reflect interference information of a user equipment side. Therefore, efficiency of scheduling the user equipment based on the downlink channel matrix by the base station is low.

SUMMARY

The present disclosure describes a method for transmitting an uplink measurement reference signal, an apparatus, and a system that help a base station obtain downlink interference information of a downlink channel.

According to an aspect, an embodiment of the present invention provides a method for transmitting an uplink measurement reference signal, where the method is applied to a network-side device and includes the following operations:

first, receiving, by the network-side device, an uplink measurement reference signal sent by user equipment, where the uplink measurement reference signal carries downlink interference information of a downlink channel of the network-side device; and then, performing downlink interference estimation on the uplink measurement reference signal, to obtain the downlink interference information.

Compared with the prior art in which a base station cannot obtain downlink interference information of a downlink channel used by user equipment, in this embodiment, the network-side device (which may be a base station) can effectively schedule the user equipment based on the downlink interference information, thereby improving scheduling efficiency, and improving data transmission efficiency of the downlink channel.

In one embodiment, the uplink measurement reference signal received by the network-side device includes a first uplink measurement reference signal and a first uplink measurement reference signal beamformed by using the downlink interference information.

The performing, by the network-side device, downlink interference estimation on the uplink measurement reference signal, to obtain interference information of the downlink channel may include:

first, performing channel estimation on the first uplink measurement reference signal, to obtain an uplink channel matrix H; performing channel estimation on the first uplink measurement reference signal beamformed by using the downlink interference information, to obtain a product H*I of the uplink channel matrix H and the downlink interference information I; and then, obtaining the downlink interference information I based on the uplink channel matrix H and the product H*I of the uplink channel matrix H and the downlink interference information I.

In one embodiment, the uplink measurement reference signal received by the network-side device includes a second uplink measurement reference signal beamformed by using a beamforming matrix V and a second uplink measurement reference signal beamformed for the second time by using the downlink interference information. In this case, the performing, by the network-side device, downlink interference estimation on the uplink measurement reference signal, to obtain interference information of the downlink channel may include:

first, performing channel estimation on the second uplink measurement reference signal beamformed by using the beamforming matrix V, to obtain a product H*V of an uplink channel matrix H and the beamforming matrix V; performing channel estimation on the secondarily beamformed second uplink measurement reference signal, to obtain a product H*V*I of the uplink channel matrix H, the beamforming matrix V, and the downlink interference information I; and then, obtaining the downlink interference information based on H*V and a product H*V*I of H*V and the downlink interference information I.

In one embodiment, the network-side device further sends codebook information to the user equipment, where the codebook information is used to indicate the beamforming matrix V used by the user equipment.

In one embodiment, before receiving the uplink measurement reference signal sent by the user equipment, the network-side device may further send an instruction message to the user equipment, where the instruction message is used to instruct the user equipment to send the downlink interference information to the network-side device, so as to coordinate direct message transmission between the user equipment and the network-side device.

In one embodiment, after obtaining two or more pieces of downlink interference information, the network-side device may select one of the pieces of downlink interference information to send downlink data to the user equipment. Before sending the downlink data, the network-side device may send a resource index corresponding to the first uplink measurement reference signal or the second uplink measurement reference signal to the user equipment. Sending the resource index can help the user equipment determine the beamforming matrix V used to receive the downlink data sent by the network-side device.

According to another aspect, an embodiment of the present disclosure provides a method for transmitting an uplink measurement reference signal, where the method is applied to user equipment and may include:

first, obtaining, by the user equipment, downlink interference information of a downlink channel of a network-side device; and then, sending an uplink measurement reference signal to the network-side device, where the uplink measurement reference signal carries the downlink interference information, so that the network-side device can obtain the downlink interference information of the downlink channel based on the uplink measurement reference signal, thereby effectively scheduling the user equipment.

In one embodiment, the sending, by the user equipment, an uplink measurement reference signal to the network-side device includes:

first, sending, by the user equipment, a first uplink measurement reference signal to the network-side device; beamforming the first uplink measurement reference signal by using the downlink interference information; and then, sending the beamformed first uplink measurement reference signal to the network-side device.

In one embodiment, the user equipment sends, by using a same time domain resource or adjacent time domain resources, the first uplink measurement reference signal and the first uplink measurement reference signal beamformed by using the downlink interference information.

In one embodiment, the user equipment sends, by using a same frequency domain resource or adjacent frequency domain resources, the first uplink measurement reference signal and the first uplink measurement reference signal beamformed by using the downlink interference information.

In one embodiment, the user equipment sends, by using a same cyclic shift or different cyclic shifts, the first uplink measurement reference signal and the first uplink measurement reference signal beamformed by using the downlink interference information.

In a possible design, the obtaining, by the user equipment, downlink interference information of a downlink channel of a network-side device includes: obtaining, by the user equipment, the downlink interference information of the downlink channel of the network-side device through calculation by using a transmission mode of transmit diversity or closed-loop spatial multiplexing. Optionally, the user equipment may calculate the downlink interference information of the downlink channel of the network-side device.

In one embodiment, the user equipment may send uplink signaling to the network-side device, where the uplink signaling carries the transmission mode of transmit diversity or closed-loop spatial multiplexing.

In one embodiment, the sending, by the user equipment, an uplink measurement reference signal to the network-side device includes:

first, sending, to the network-side device, a second uplink measurement reference signal beamformed by using a beamforming matrix V; then, beamforming, for the second time by using the downlink interference information, the second uplink measurement reference signal beamformed by using the beamforming matrix V; and sending the secondarily beamformed second uplink measurement reference signal to the network-side device.

In one embodiment, the sending, by the user equipment, an uplink measurement reference signal to the network-side device includes:

first, beamforming a third uplink measurement reference signal by using the beamforming matrix V; then, beamforming, for the second time by using the downlink interference information, the third uplink measurement reference signal beamformed by using the beamforming matrix V; and sending the secondarily beamformed third uplink measurement reference signal to the network-side device.

In one embodiment, the user equipment may receive a resource index or codebook information sent by the network-side device, and determine, based on the resource index or the codebook information, a beamforming matrix V used to send the uplink measurement reference signal.

According to a third aspect, an embodiment of the present invention provides user equipment, where the user equipment includes a transceiver and a processor. The processor is configured to obtain downlink interference information of a downlink channel of a network-side device; and the transceiver is configured to send an uplink measurement reference signal to the network-side device, where the uplink measurement reference signal carries the downlink interference information.

In one embodiment, the transceiver of the user equipment sends the uplink measurement reference signal to the network-side device includes:

sending a first uplink measurement reference signal to the network-side device; then, beamforming the first uplink measurement reference signal by using the downlink interference information; and sending, to the network-side device, the first uplink measurement reference signal beamformed by using the downlink interference information.

In one embodiment, the transceiver of the user equipment sends the uplink measurement reference signal to the network-side device includes:

sending, to the network-side device, a second uplink measurement reference signal beamformed by using a beamforming matrix V; then, beamforming, for the second time by using the downlink interference information, the second uplink measurement reference signal beamformed by using the beamforming matrix V; and sending the secondarily beamformed second uplink measurement reference signal to the network-side device.

In one embodiment, the transceiver of the user equipment is further configured to: before sending, to the network-side device, the second uplink measurement reference signal beamformed by using the beamforming matrix V, receive codebook information sent by the network-side device, and the processor is further configured to obtain the beamforming matrix V based on the codebook information.

In one embodiment, the transceiver of the user equipment is further configured to: before the processor obtains the downlink interference information of the downlink channel of the network-side device, receive an instruction message sent by the network-side device, where the instruction message is used to instruct the user equipment to send the downlink interference information to the network-side device.

In one embodiment, the transceiver of the user equipment sends, by using a same time domain resource or adjacent time domain resources, the first uplink measurement reference signal and the first uplink measurement reference signal beamformed by using the downlink interference information; or the transceiver of the user equipment sends, by using a same frequency domain resource or adjacent frequency domain resources, the first uplink measurement reference signal and the first uplink measurement reference signal beamformed by using the downlink interference information; or the transceiver of the user equipment sends, by using a same cyclic shift or different cyclic shifts, the initial first uplink measurement reference signal and the first uplink measurement reference signal beamformed by using the downlink interference information.

The time domain resource, the frequency domain resource, and the cyclic shift may be used in combination. For example, the transceiver of the user equipment sends, by using a same time domain resource and different cyclic shifts, the first uplink measurement reference signal and the first uplink measurement reference signal beamformed by using the downlink interference information.

Optionally, the user equipment may alternatively send, by using the time domain resource, the frequency domain resource, and the cyclic shift, the second uplink measurement reference signal beamformed by using the beamforming matrix V and the secondarily beamformed second uplink measurement reference signal.

According to a fourth aspect, an embodiment of the present invention provides a network-side device, where the network-side device includes a transceiver and a processor.

The transceiver is configured to receive an uplink measurement reference signal sent by user equipment, where the uplink measurement reference signal carries downlink interference information of a downlink channel of the network-side device.

The processor is configured to perform downlink interference estimation on the uplink measurement reference signal, to obtain the downlink interference information.

In one embodiment, the uplink measurement reference signal received by the transceiver of the network-side device includes a first uplink measurement reference signal and a first uplink measurement reference signal beamformed by using the downlink interference information.

That the processor of the network device performs downlink interference estimation on the uplink measurement reference signal, to obtain interference information of the downlink channel includes performing channel estimation on the first uplink measurement reference signal, to obtain an uplink channel matrix H; then, performing channel estimation on the first uplink measurement reference signal beamformed by using the downlink interference information, to obtain a product H*I of the uplink channel matrix H and the downlink interference information I; and obtaining the downlink interference information based on the uplink channel matrix H and the product H*I.

In one embodiment, the transceiver of the network-side device is further configured to: before receiving the uplink measurement reference signal sent by the user equipment, send an instruction message to the user equipment, where the instruction message is used to instruct the user equipment to send the downlink interference information to the network-side device.

In one embodiment, the uplink measurement reference signal received by the transceiver of the network-side device includes a second uplink measurement reference signal beamformed by using a beamforming matrix V and a second uplink measurement reference signal obtained by beamforming, for the second time by using the downlink interference information, the second uplink measurement reference signal beamformed by using the beamforming matrix V; and that the processor of the network-side device performs downlink interference estimation on the uplink measurement reference signal, to obtain interference information of the downlink channel includes:

performing channel estimation on the second uplink measurement reference signal beamformed by using the beamforming matrix V, to obtain a product H*V of an uplink channel matrix H and the beamforming matrix V; then, performing channel estimation on the secondarily beamformed second uplink measurement reference signal, to obtain a product of the uplink channel matrix H, the beamforming matrix V, and the downlink interference information; and obtaining the downlink interference information based on H*V and a product of H*V and the downlink interference information.

According to a fifth aspect, an embodiment of the present invention provides a system for transmitting an uplink measurement reference signal, where the system includes the user equipment according to the third aspect and the network-side device according to the fourth aspect.

In the embodiments described in all the foregoing aspects, the instruction message sent by the network-side device may be used to instruct the user equipment to send, simultaneously or together to the network-side device, the first uplink measurement reference signal and the first uplink measurement reference signal beamformed by using the downlink interference information.

The instruction message sent by the network-side device may be used to instruct the user equipment to send, simultaneously or together to the network-side device, the second uplink measurement reference signal beamformed by using the beamforming matrix V and the second uplink measurement reference signal secondarily beamformed by using the downlink interference information. The instruction message may be uplink measurement reference signal scheduling signaling.

BRIEF DESCRIPTION OF DRAWINGS

To describe the embodiments of the present invention more clearly, the following briefly describes the accompanying drawings required for describing the embodiments. The accompanying drawings in the following description show some embodiments of the present disclosure.

DESCRIPTION OF EMBODIMENTS

The following describes the technical solutions in the embodiments of the present invention with reference to the accompanying drawings in the embodiments of the present invention.

Figure 1:
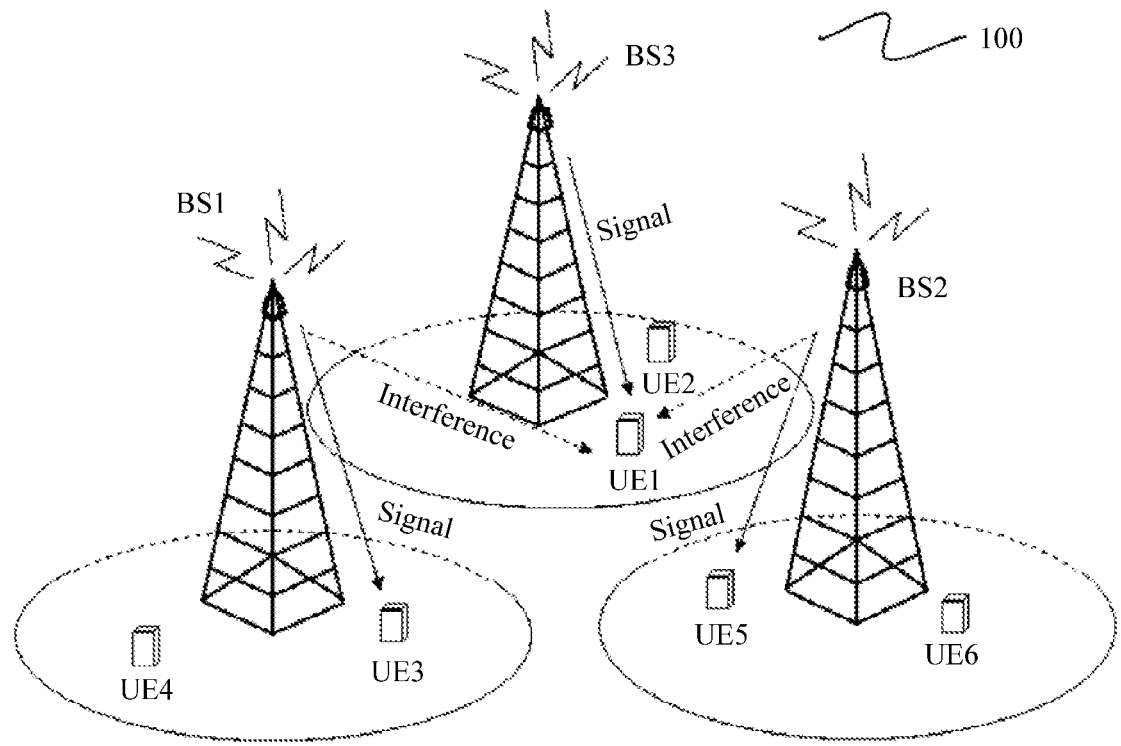
FIG. 1 is a schematic diagram of a communications system according to an embodiment of the present invention.

To resolve a prior-art problem that a base station cannot obtain downlink interference information and therefore efficiency of scheduling user equipment is low, the embodiments of the present invention provide a solution based on a communications system shown in FIG. 1, to improve efficiency of scheduling user equipment in the communications system. As shown in FIG. 1, an embodiment of the present invention provides a communications system 100. The communications system 100 includes at least one base station (BS) and user equipment (UE). The figure shows a plurality of base stations BS1 to BS3 and a plurality of user equipments UE1 to UE6. The user equipment and the base station may perform cellular communication, UE1 and UE2 are located within coverage of BS3, UE3 and UE4 are located within coverage of BS1, and UE5 and UE6 are located within coverage of BS2.

In this embodiment of the present invention, the foregoing communications system 100 may be a system of various radio access technologies (RAT), such as Code Division Multiple Access (CDMA), Time Division Multiple Access (TDMA), Frequency Division Multiple Access (FDMA), orthogonal frequency division multiple access (OFDMA), and single carrier frequency division multiple access (single carrier FDMA, SC-FDMA), another system, or the like. The terms "system" and "network" can be interchanged with each other. A CDMA system may implement wireless technologies such as Universal Terrestrial Radio Access (universal terrestrial radio access, UTRA) and CDMA2000. UTRA may include a Wideband CDMA (WCDMA) technology or another variant technology of CDMA. CDMA2000 may cover Interim Standard 2000 (IS-2000), IS-95, and IS-856 standards. A TDMA system may implement wireless technologies such as Global System for Mobile Communications (GSM). An OFDMA system may implement wireless technologies such as evolved Universal Terrestrial Radio Access (evolved UTRA, E-UTRA), Ultra Mobile Broadband (UMB), IEEE 802.11 (Wi-Fi), IEEE 802.16 (WiMAX), IEEE 802.20, and Flash OFDMA. UTRA and E-UTRA are UMTS and an evolved release of UMTS. 3GPP is a novel release of UMTS using E-UTRA in Long Term Evolution (LTE) and various evolved releases based on LTE. In addition, the communications system 100 may also be applicable to future-oriented communications technologies. A system architecture and a service scenario described in this embodiment of the present disclosure are used to more clearly describe the technical solutions in this embodiment of the present disclosure, but are not intended to limit the technical solutions provided in this embodiment of the present disclosure. A person of ordinary skill in the art may know that as a network architecture evolves and a new service scenario emerges, the technical solutions provided in this embodiment of the present disclosure are also applicable to a similar technical problem.

In this embodiment of the present invention, the base station (for example, BS1 to BS3) is an apparatus that is deployed in a radio access network and that is configured to provide a wireless communication function for UE. The base station may include various forms of macro base stations, micro base stations (also referred to as femto, pico, or small cell), relay stations, access points, or the like. A device having a base station function may have different names in systems using different radio access technologies. For example, the device may be referred to as a gNodeB or a transmission point (TRP) in a 5G system, is referred to as an evolved NodeB (eNB, or eNodeB) in an LTE system, and is referred to as a NodeB in a 3rd Generation (3G) system. For ease of description, in all the embodiments of the present disclosure, the foregoing base station and NodeB, and other apparatuses providing a wireless communication function for UE are collectively referred to as network-side devices.

UE in this embodiment of the present invention may include various handheld devices, in-vehicle devices, wearable devices, or computing devices that have a wireless communication function, or other processing devices connected to a wireless modem. The UE may alternatively be referred to as a mobile station (MS), user terminal equipment, or a user equipment device (terminal equipment), and may further include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, machine type communication (MTC) user equipment, and the like. In all the embodiments of the present invention, the devices mentioned above are collectively referred to as UE.

In addition, in the communications system 100 shown in FIG. 1, although the base stations BS1 to BS3 and the plurality of UEs are shown, the communications system 100 may include, but is not limited to including, the base stations and the UEs, and may further include a core network device, a device for carrying a virtualized network function, or the like. These are obvious to a person of ordinary skill in the art and are not described in detail herein one by one.

In a solution of this embodiment, when UE1 receives downlink data from BS3, radio signals transmitted by other base stations (for example, BS1 and BS2) produce interference to downlink data reception of UE1. In this embodiment of the present disclosure, after obtaining downlink interference information of a downlink channel, UE1 directly sends an uplink measurement reference signal to a network-side device (for example, BS3), and the uplink measurement reference signal carries the downlink interference information. Further, after receiving the uplink measurement reference signal carrying the downlink interference information and sent by UE1, the network-side device (for example, BS3) performs downlink interference estimation on the uplink measurement reference signal, so as to obtain the downlink interference information. Compared with the prior art in which a base station BS3 cannot obtain downlink interference information of a downlink channel used by UE1, in this embodiment, BS3 can effectively schedule UE1 based on the downlink interference information, thereby improving scheduling efficiency and data transmission efficiency.

Figure 2:
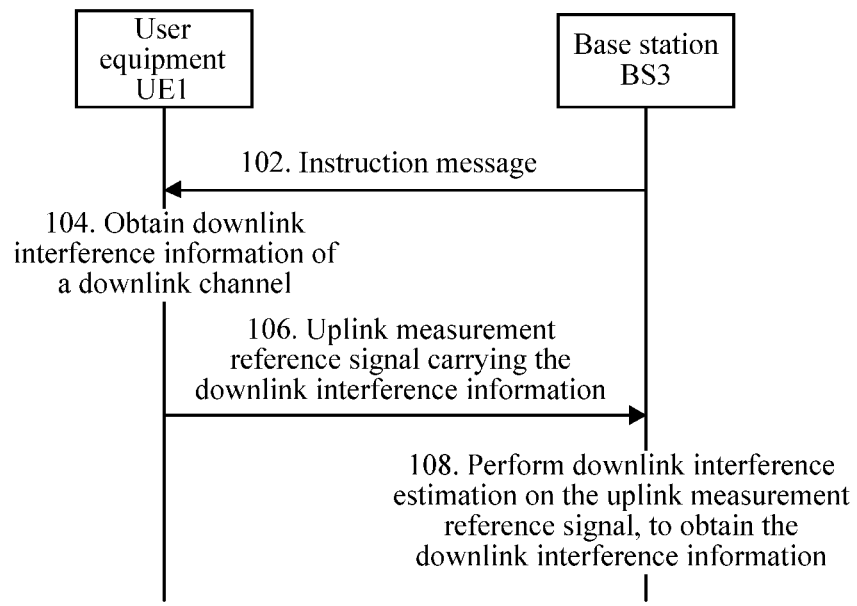
FIG. 2 is a flowchart of a method for transmitting an uplink measurement reference signal according to an embodiment of the present invention.

FIG. 2 is a flowchart of a method for transmitting an uplink measurement reference signal according to an embodiment of the present invention.

In this embodiment of the present disclosure, a base station (for example, BS3) provides a cellular network for user equipment (for example, UE1). UE1 is currently in connected mode (connected mode).

As shown in FIG. 2, after receiving an instruction message from the base station BS3 (operation 102), UE1 may start to perform a step of sending downlink interference information to BS3. UE1 may alternatively actively send downlink interference information to BS3 in connected mode. In addition, UE1 may periodically send downlink interference information to BS3, to help BS3 receive the downlink interference information.

Before sending the downlink interference information to BS3, UE1 first obtains downlink interference information of a downlink channel of BS3 (operation 104), and then, sends, to BS3, an uplink measurement reference signal carrying the downlink interference information. UE1 may obtain the downlink interference information through calculation based on a particular transmission mode, such as transmit diversity or closed-loop spatial multiplexing. The downlink interference information may correspond to the particular transmission mode. After obtaining the downlink interference information based on the particular transmission mode, UE1 may notify the base station BS3 of the transmission mode. UE1 may send a determined transmission mode to BS3 by using newly added uplink signaling or by using the foregoing uplink measurement reference signal, so that the base station BS3 can send downlink data by using the transmission mode determined by UE1, making data transmission efficiency higher. In addition, UE1 may alternatively obtain the downlink interference information through calculation based on no particular mode, and send the downlink interference information to the base station BS3, and the base station BS3 may obtain unprocessed downlink interference information.

It should be noted that there is no definite timing relationship between operations 102 and 104. UE1 may obtain the downlink interference information of the downlink channel before receiving the instruction message from BS3, or may obtain the downlink interference information of the downlink channel after receiving the instruction message from BS3.

In operation 104, UE1 may send the uplink measurement reference signal to BS3 in the following manners.

Manner 1a: UE1 sends a first uplink measurement reference signal to BS3, beamforms the first uplink measurement reference signal by using the downlink interference information obtained in operation 102, and then sends the beamformed first uplink measurement reference signal to BS3.

The uplink measurement reference signal may also be referred to as an uplink sounding reference signal (SRS), and may be a standard sequence such as a Zad-off Chu sequence. In addition, the first uplink measurement reference signal may also be referred to as a first uplink measurement reference signal without being beamformed through downlink interference. The foregoing "first" is used for distinguishing from a subsequent "second". A manner of beamforming may be beamforming or modulation.

Manner 2a: UE1 sends, to BS3, a second uplink measurement reference signal beamformed by using a beamforming matrix V, then, beamforms, for the second time by using the downlink interference information, the second uplink measurement reference signal beamformed by using the beamforming matrix V, and sends the secondarily beamformed second uplink measurement reference signal to BS3.

The beamforming matrix V may be from codebook information (which may be referred to as a codebook) sent by BS3, and UE1 obtains the beamforming matrix V based on the codebook information. In addition, UE1 may alternatively perform channel estimation on the downlink channel of the base station BS3, to obtain a downlink channel matrix, and then, obtain the beamforming matrix V through calculation by using the downlink channel matrix. For example, singular value decomposition (SVD) is performed on the downlink channel matrix.

The second uplink measurement reference signal beamformed by using the beamforming matrix V may also be referred to as a second uplink measurement reference signal beamformed without downlink interference, and the secondarily beamformed second uplink measurement reference signal may also be referred to as a second uplink measurement reference signal beamformed by using downlink interference information. Compared with the foregoing manner 1a, a method for a second uplink measurement reference signal provided by the manner 2a can improve coverage of the uplink measurement reference signal sent by UE1, and increase a signal-to-interference ratio of the uplink measurement reference signal received by BS3, or in a case of a same signal-to-interference ratio, reduce power at which UE1 sends the uplink measurement reference signal, and reduce power consumption of UE1.

In the embodiments provided by the manner 1a and the manner 2a, after UE1 beamforms the first uplink measurement reference signal and the second uplink measurement reference signal by using the downlink interference information, the first uplink measurement reference signal and the second uplink measurement reference signal can carry the downlink interference information. UE1 may send the second uplink measurement reference signal beamformed by using the beamforming matrix V and the secondarily beamformed second uplink measurement reference signal through a particular resource such as a subframe. UE1 may send, through a compound signal, the first uplink measurement reference signal without being beamformed through downlink interference and the first uplink measurement reference signal beamformed by using the downlink interference information, or separately send the first uplink measurement reference signal without being beamformed through downlink interference and the first uplink measurement reference signal beamformed by using the downlink interference information. Correspondingly, UE1 may also send, through a compound signal, the second uplink measurement reference signal beamformed without downlink interference and the second uplink measurement reference signal beamformed by using the downlink interference information, or separately send the second uplink measurement reference signal beamformed without downlink interference and the second uplink measurement reference signal beamformed by using the downlink interference information.

Still referring to FIG. 2, when the base station BS3 needs to obtain the downlink interference information of UE1 (for example, when BS3 needs to send downlink data to UE1), the base station BS3 sends an instruction message to UE1 (operation 102), to instruct UE1 to send the downlink interference information to BS3. The instruction message sent by BS3 may be uplink measurement reference signal scheduling signaling. The instruction message may alternatively be sent through physical layer signaling, Radio Resource Control layer signaling, or media access control control element (MACCE) layer signaling.

In one embodiment, BS3 may alternatively determine a transmission mode, such as transmit diversity or closed-loop spatial multiplexing, corresponding to the downlink interference information, and then, notify UE1 of the determined transmission mode. BS3 may add the determined transmission mode to the instruction message and send the instruction message to UE1, or add downlink signaling and send the downlink signaling to UE1, or pre-configure a transmission mode for UE1, and UE1 obtains, based on the transmission mode determined by BS3, the downlink interference information corresponding to the transmission mode.

After sending the instruction message, BS3 receives the uplink measurement reference signal carrying the downlink interference information and sent by UE1 (operation 106). BS3 performs downlink interference estimation on the received uplink measurement reference signal, to obtain the downlink interference information (operation 108). Further, BS3 may schedule UE1 based on the downlink interference information, and then, send downlink data to UE1.

In operation 108, BS3 may obtain the downlink interference information in the following manners.

Manner 1b: BS3 performs channel estimation on the first uplink measurement reference signal without being beamformed by using the downlink interference information, to obtain an uplink channel matrix H; performs channel estimation on the first uplink measurement reference signal beamformed by using the downlink interference information, to obtain a product H*I of the uplink channel matrix H and the downlink interference information I; and then, obtains the downlink interference information based on the uplink channel matrix H and the product H*I.

Corresponding to the manner 1a, because UE1 sends the first uplink measurement reference signal without being beamformed by using the downlink interference information and the first uplink measurement reference signal beamformed by using the downlink interference information, BS3 performs channel estimation on the first uplink measurement reference signal without being beamformed by using the downlink interference information, to obtain the uplink channel matrix H. BS3 further performs channel estimation on the first uplink measurement reference signal beamformed by using the downlink interference information, to obtain the product H*I of the uplink channel matrix H and the downlink interference information I. BS3 can further obtain the downlink interference information I based on the product of H*I and the uplink channel matrix H.

Manner 2b: BS3 performs channel estimation on the second uplink measurement reference signal beamformed by using the beamforming matrix V, to obtain a product H*V of an uplink channel matrix H and the beamforming matrix V; performs channel estimation on the secondarily beamformed second uplink measurement reference signal, to obtain a product of the uplink channel matrix H, the beamforming matrix V, and the downlink interference information; and then, obtains the downlink interference information based on H*V and a product of H*V and the downlink interference information.

Corresponding to the manner 2a, because UE1 sends the second uplink measurement reference signal beamformed by using the beamforming matrix V, and the second uplink measurement reference signal obtained by beamforming, for the second time by using the downlink interference information, the second uplink measurement reference signal beamformed by the beamforming matrix V, BS3 performs channel estimation on the received second uplink measurement reference signal beamformed without using the downlink interference information, to obtain the product H*V of the uplink channel matrix H and the beamforming matrix V. BS3 further performs channel estimation on the second uplink measurement reference signal beamformed by using the downlink interference information, to obtain a product H*V*I of the uplink channel matrix H, the beamforming matrix V, and the downlink interference information I. In this way, BS3 can obtain the downlink interference information I based on the product of H*V*I and the product of H*V.

In the embodiments provided by the manners 1b and 2b, the channel estimation method used by the base station BS3 may, for example, be a minimum mean square error (MMSE) method.

In an embodiment of the method for transmitting an uplink measurement reference signal, UE1 may send, by using a same time domain resource or adjacent time domain resources, the first uplink measurement reference signal without being beamformed by using the downlink interference information and the first uplink measurement reference signal beamformed by using the downlink interference information, or may send, by using a same frequency domain resource or adjacent frequency domain resources, the first uplink measurement reference signal without being beamformed by using the downlink interference information and the first uplink measurement reference signal beamformed by using the downlink interference information. UE1 may alternatively send, by using a same cyclic shift or different cyclic shifts, the first uplink measurement reference signal without being beamformed by using the downlink interference information and the first uplink measurement reference signal beamformed by using the downlink interference information. In addition, the foregoing time domain resource, frequency domain resource, and cyclic shift may be used in combination. For example, UE1 may alternatively send, by using a same time domain resource and adjacent frequency domain resources or a same time domain resource and different cyclic shifts, the first uplink measurement reference signal without being beamformed by using the downlink interference information and the first uplink measurement reference signal beamformed by using the downlink interference information. It should be noted that, only the methods for sending the first uplink measurement reference signal without being beamformed by using the downlink interference information and the first uplink measurement reference signal beamformed by using the downlink interference information are described above, and the foregoing sending methods for sending the time domain resource, the frequency domain resource, and the cyclic shift are also applicable to the second uplink measurement reference signal beamformed by using the beamforming matrix V and the second uplink measurement reference signal secondarily beamformed by using the downlink interference information.

Figure 3:
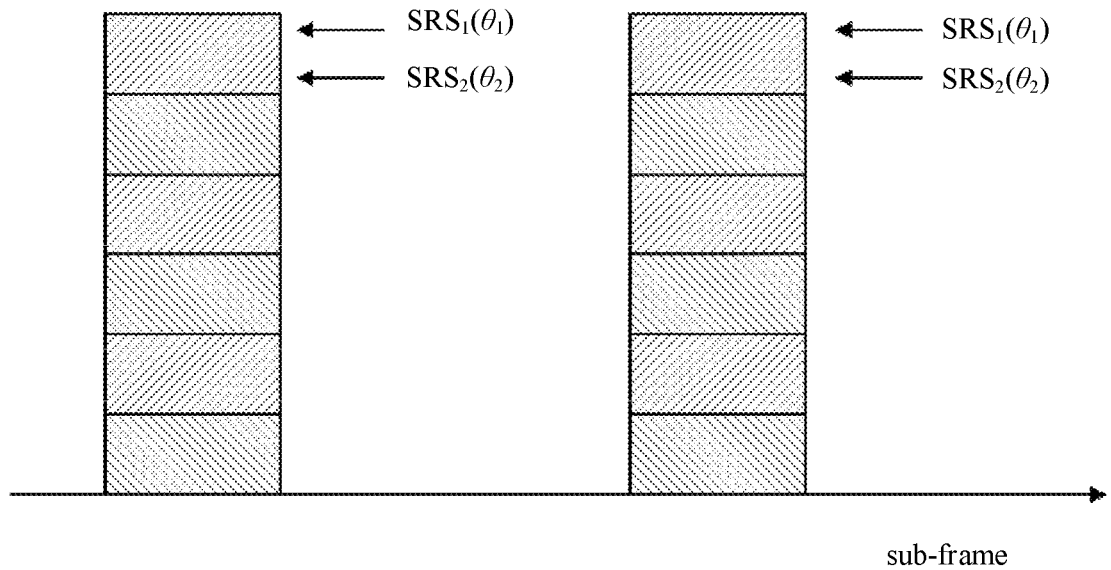
FIG. 3 is a resource configuration diagram of sending, by UE, an uplink measurement reference signal according to an embodiment of the present invention.

FIG. 3 is a resource configuration diagram of sending, by UE1, an uplink measurement reference signal according to an embodiment of the present invention. UE1 sends, on a same time domain resource, for example, in a subframe (sub-frame), a same frequency domain resource, for example, a comb (comb), and different cyclic shifts (cyclic shift), a first uplink measurement reference signal $SRS_1(\theta_1)$ without being beamformed by using downlink interference information and a first uplink measurement reference signal $SRS_2(\theta_2)$ beamformed by using downlink interference information, thereby ensuring orthogonality between the two signals $SRS_1(\theta_1)$ and $SRS_2(\theta_2)$. $\theta_1$ and $\theta_2$ represent different cyclic shifts or phases. A sequence of $SRS_1(\theta_1)$ may be $e^{j\theta_1 n}F(n)$, and a sequence of $SRS_2(\theta_2)$ may be $e^{j\theta_2 n}F(n)$. $SRS_1(\theta_1)$ and $SRS_2(\theta_2)$ may be located in a same comb.

In addition, $SRS_1(\theta_1)$ may alternatively represent a second uplink measurement reference signal beamformed by using a beamforming matrix V, and $SRS_2(\theta_2)$ may alternatively represent a second uplink measurement reference signal beamformed by using downlink interference information.

Figure 4:
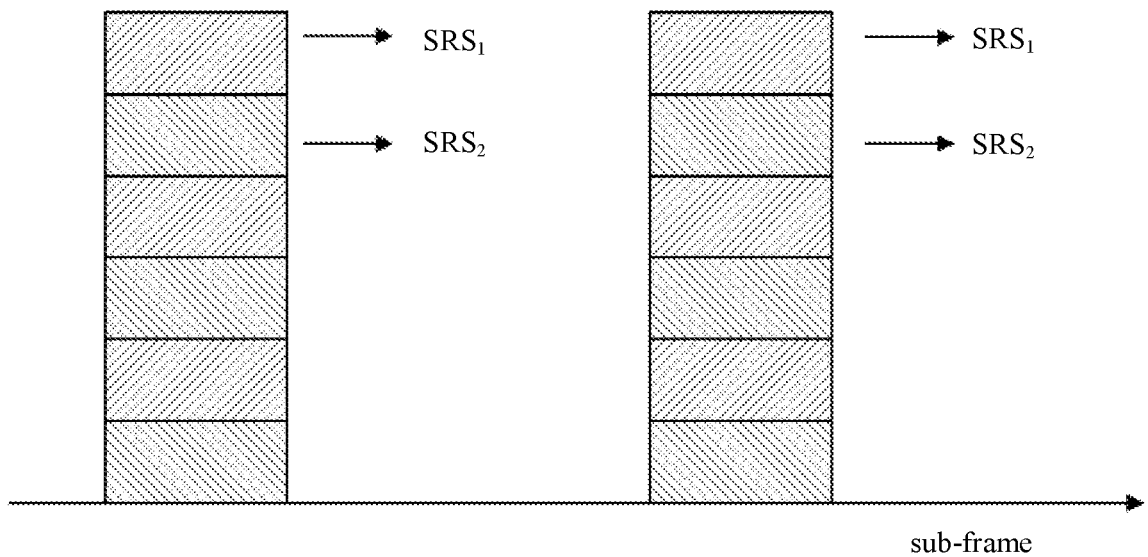
FIG. 4 is another resource configuration diagram of sending, by UE, an uplink measurement reference signal according to an embodiment of the present invention.

FIG. 4 is another resource configuration diagram of sending, by UE, an uplink measurement reference signal. UE sends, on a same time domain resource, for example, in a subframe (sub-frame), and different combs (for example, adjacent combs), a first uplink measurement reference signal $SRS_1$ without being beamformed by using downlink interference information and a first uplink measurement reference signal $SRS_2$ beamformed by using downlink interference information, thereby ensuring orthogonality between the two signals $SRS_1$ and $SRS_2$. $SRS_1$ may alternatively represent a second uplink measurement reference signal beamformed by using a beamforming matrix V, and $SRS_2$ may alternatively represent a second uplink measurement reference signal beamformed by using downlink interference information. In the resource configuration diagrams shown in FIG. 3 and FIG. 4, a horizontal axis represents time (subframe), and areas filled with left slashes and areas filled with right slashes separately represent different combs.

Figure 5:
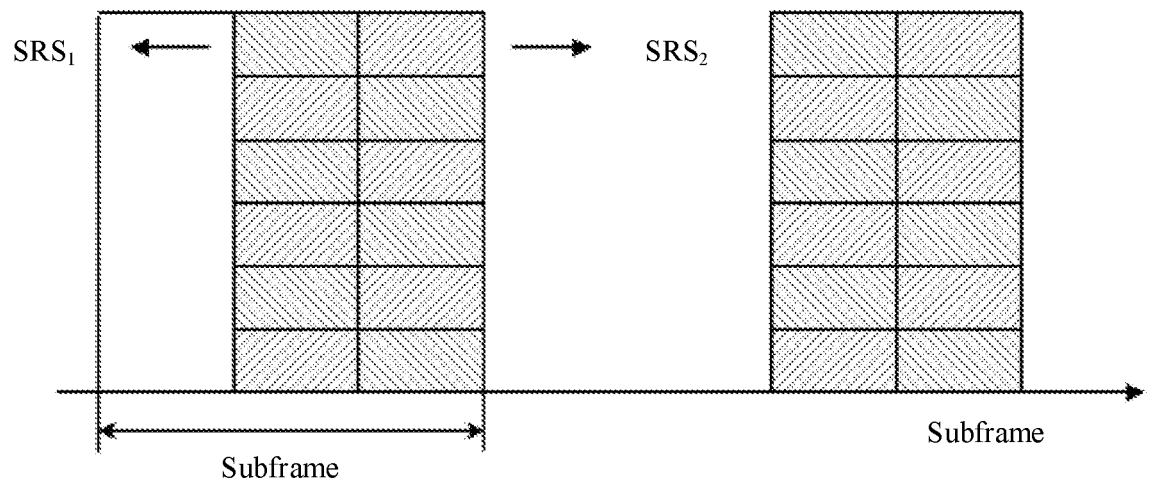
FIG. 5 is another resource configuration diagram of sending, by UE, an uplink measurement reference signal according to an embodiment of the present invention.

FIG. 5 is another resource configuration diagram of sending, by UE, an uplink measurement reference signal. UE sends, in a same subframe (sub-frame) and on different symbols (symbol), a first uplink measurement reference signal $SRS_1$ without being beamformed by using downlink interference information and a first uplink measurement reference signal $SRS_2$ beamformed by using downlink interference information, thereby ensuring orthogonality between the two signals $SRS_1$ and $SRS_2$ and further improving accumulated power for uplink measurement reference signal transmission. $SRS_1$ may alternatively represent a second uplink measurement reference signal beamformed by using a beamforming matrix V, and $SRS_2$ may alternatively represent a second uplink measurement reference signal beamformed by using downlink interference information. $SRS_1$ and $SRS_2$ may use a same frequency domain resource or different frequency domain resources. This is not limited in this embodiment.

In the resource configuration diagram shown in FIG. 5, a horizontal axis represents time (subframe), and areas filled with left slashes and areas filled with right slashes separately represent different symbols. With reference to the resource configuration diagrams shown in FIG. 3 to FIG. 5, UE1 may periodically send the uplink measurement reference signal, for example, once every two subframes. In addition, UE1 may alternatively send a plurality of uplink measurement reference signals with different purposes (for example, UE1 respectively sends uplink measurement reference signals when UE1 is located on an edge of a cell or at a central position of a cell), for example, send, in a first subframe, a second uplink measurement reference signal beamformed by using a beamforming matrix V1 and a second uplink measurement reference signal secondarily beamformed by using downlink interference information and the beamforming matrix V1, and send, in a fourth subframe, a second uplink measurement reference signal beamformed by using a beamforming matrix V2 and a second uplink measurement reference signal secondarily beamformed by using downlink interference information and the beamforming matrix V2. A base station BS3 may select one of the uplink measurement reference signals to perform channel and interference estimation (for example, select the second uplink measurement reference signal beamformed by using the beamforming matrix V2 and the second uplink measurement reference signal secondarily beamformed by using the downlink interference information and the beamforming matrix V2 that are sent in the fourth subframe), so as to determine a beamforming manner W and a modulation and coding scheme (modulation and coding scheme, MCS) level when BS3 transmits downlink data. Correspondingly, if UE1 uses the beamforming matrix V2 when sending the second uplink measurement reference signal, UE1 may also use the beamforming matrix V2 to receive data when receiving the downlink data. To ensure that UE1 receives data by the beamforming matrix V2, the base station may inform UE1 of the beamforming matrix V2 through codebook information (through the codebook information mentioned in the foregoing manner 2a), and UE1 obtains the beamforming matrix V2 based on the codebook information. In addition, BS3 may alternatively inform UE1 of a resource index of the second uplink measurement reference signal (the uplink measurement reference signal may be construed as a resource). UE1 determines, based on the resource index, a corresponding second uplink measurement reference signal beamformed by using the beamforming matrix V2, thereby learning that the beamforming matrix V2 is used during sending of the second uplink measurement reference signal.

For a case in which UE1 sends one type of uplink measurement reference signals, for example, sends, in the first subframe, the second uplink measurement reference signal beamformed by using the beamforming matrix V1 and the second uplink measurement reference signal secondarily beamformed by using the downlink interference information, and the beamforming matrix V1, and sends, in the fourth subframe, the second uplink measurement reference signal beamformed by using the beamforming matrix V1 and the second uplink measurement reference signal secondarily beamformed by using the downlink interference information and the beamforming matrix V1, BS3 may not instruct a terminal to receive beamforming information, and a transceiver antenna of UE1 can receive downlink data from BS1 provided that the transceiver antenna of UE1 remains with same beamforming. In addition, when UE1 sends the uplink measurement reference signal in the manner 1a or 1b, the transceiver antenna of UE1 can also remain with the same beamforming to receive the downlink data from BS1.

In the foregoing embodiments, the method for transmitting an uplink measurement reference signal is described separately from perspectives of the user equipment and the base station, and interaction between the user equipment and the base station. It may be understood that, to implement the foregoing functions, network elements, such as the user equipment and the base station, include corresponding hardware structures and/or software modules for implementing the functions. A person skilled in the art should easily be aware that, in combination with the examples described in the embodiments disclosed in this specification, units, algorithms steps can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 6:
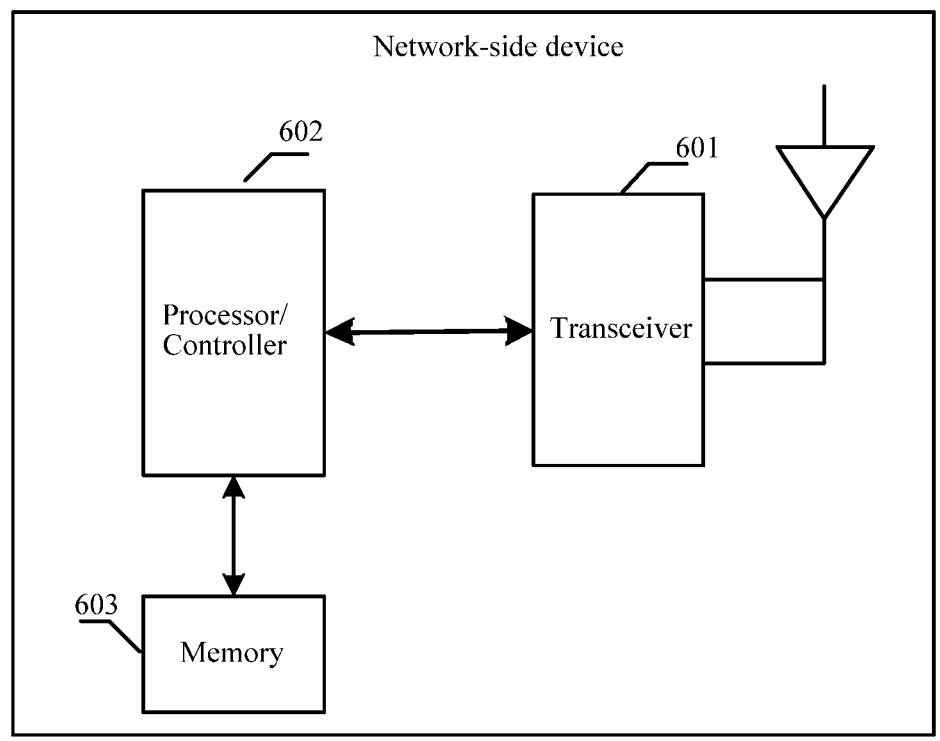
FIG. 6 is a schematic structural diagram of a network-side device according to an embodiment of the present invention.

FIG. 6 is a possible schematic structural diagram of a network-side device according to an embodiment of the present invention. The network-side device may be the base stations BS1, BS2, and BS3 shown in FIG. 1 and FIG. 2.

The network-side device provided in this embodiment includes:

According to a fourth aspect, an embodiment of the present invention provides a network-side device, where the network-side device includes a transceiver 601 and a processor 602 (which may also be referred to as a controller). In addition, the network-side device may further include a memory 603.

The transceiver 601 is configured to receive and send, by the network-side device, signals, for example, receive an uplink measurement reference signal sent by user equipment, where the uplink measurement reference signal carries downlink interference information of a downlink channel of the network-side device.

The processor 602 is configured to perform control management on the network-side device, for example, perform downlink interference estimation on the uplink measurement reference signal received by the transceiver 601, to obtain the downlink interference information. In an example, the controller/processor 602 is configured to support the network-side device in performing an operation, for example, operation 108, of the method on the side of the base station BS3 in FIG. 2. The memory 603 is configured to store program code and data of the network-side device.

The uplink measurement reference signal received by the transceiver 601 of the network-side device includes a first uplink measurement reference signal and a first uplink measurement reference signal beamformed by using the downlink interference information. For the case in which the processor 602 of the network device performs downlink interference estimation on the uplink measurement reference signal, to obtain interference information of the downlink channel, refer to the related descriptions of the manner 1b in the foregoing method embodiment. Details are not described herein again.

The uplink measurement reference signal received by the transceiver 601 of the network-side device includes a second uplink measurement reference signal beamformed by using a beamforming matrix V and a second uplink measurement reference signal obtained by secondarily beamforming, by using the downlink interference information, the second uplink measurement reference signal beamformed by using the beamforming matrix V. For the case in which the processor of the network-side device performs downlink interference estimation on the uplink measurement reference signal, to obtain interference information of the downlink channel, refer to the related descriptions of the manner 2b in the foregoing method embodiment. Details are not described herein again.

Optionally, the transceiver 601 of the network-side device is further configured to: before receiving the uplink measurement reference signal sent by the user equipment, send an instruction message to the user equipment, where the instruction message is used to instruct the user equipment to send the downlink interference information to the network-side device.

It may be understood that, FIG. 6 merely shows a simplified design of the network-side device. In an actual application, the network-side device may include any quantity of transmitters, receivers, processors, controllers, modulators, memories, or the like. All network-side devices that can implement the present disclosure fall within the protection scope of the present disclosure.

Figure 7:
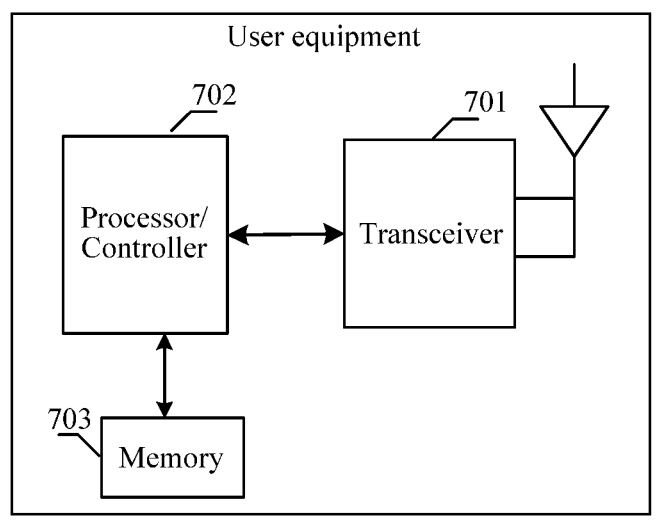
FIG. 7 is a schematic structural diagram of user equipment according to an embodiment of the present invention.

FIG. 7 is a schematic structural diagram of user equipment according to an embodiment of the present invention. The user equipment may be UE1 to UE6 shown in FIG. 1 and FIG. 2.

The user equipment provided in this embodiment includes a transceiver 701 and a processor 702 (which may also be referred to as a controller). In addition, the user equipment may further include a memory 703.

The processor 702 is configured to perform control management on the user equipment, for example, obtain downlink interference information of a downlink channel of a network-side device. The transceiver 701 is configured to receive and send, by the user equipment, signals, for example, send an uplink measurement reference signal to the network-side device, where the uplink measurement reference signal carries the downlink interference information. In an example, the controller/processor 702 is configured to support the user equipment in performing an operation, for example, operation 104, of the method on the side of UE1 in FIG. 2. The memory 703 is configured to store program code and data of the user equipment.

That the transceiver 701 of the user equipment sends the uplink measurement reference signal to the network-side device may use related descriptions of the manner 1a or 2a in the foregoing method embodiment. Details are not described herein again. Further, the transceiver 701 of the user equipment may send, by using a same time domain resource or adjacent time domain resources, the first uplink measurement reference signal and the first uplink measurement reference signal beamformed by using the downlink interference information. The transceiver 701 of the user equipment may alternatively send, by using a same frequency domain resource or adjacent frequency domain resources, the first uplink measurement reference signal and the first uplink measurement reference signal beamformed by using the downlink interference information. The transceiver 701 of the user equipment may alternatively send, by using a same cyclic shift or different cyclic shifts, the first uplink measurement reference signal and the first uplink measurement reference signal beamformed by using the downlink interference information. The transceiver 701 of the user equipment may alternatively send, by using a same time frequency resource and different cyclic shifts, the first uplink measurement reference signal and the first uplink measurement reference signal beamformed by using the downlink interference information. For specific sending processes, refer to the related descriptions of FIG. 3 to FIG. 5.

The transceiver 701 of the user equipment is further configured to: before sending, to the network-side device, the second uplink measurement reference signal beamformed by using the beamforming matrix V, receive codebook information sent by the network-side device, and the processor 702 is further configured to obtain the beamforming matrix V based on the codebook information.

The transceiver 701 of the user equipment is further configured to: before the processor 702 obtains the downlink interference information of the downlink channel of the network-side device, receive an instruction message sent by the network-side device, where the instruction message is used to instruct the user equipment to send the downlink interference information to the network-side device.

The instruction message sent by the network-side device may be used to instruct the user equipment to send, simultaneously or together to the network-side device, the first uplink measurement reference signal and the first uplink measurement reference signal beamformed by using the downlink interference information. The instruction message may alternatively be used to instruct the user equipment to send, simultaneously or together to the network-side device, the second uplink measurement reference signal beamformed by using the beamforming matrix V and the second uplink measurement reference signal secondarily beamformed by using the downlink interference information. The instruction message may be uplink measurement reference signal scheduling signaling.

It may be understood that, FIG. 7 merely shows a simplified design of the user equipment. In an actual application, the user equipment may include any quantity of transmitters, receivers, processors, controllers, modulators, memories, displays, or the like. All user equipments that can implement the present disclosure fall within the protection scope of the present disclosure.

An embodiment of the present invention further provides a system for transmitting an uplink measurement reference signal. The system includes the user equipment and the network-side device described in the foregoing embodiments. For specific structures and functions of the user equipment and the network-side device, refer to the related descriptions in the foregoing embodiments. Details are not described herein again.

Method or algorithm operations described in combination with the content disclosed in the embodiments of the present invention may be implemented by hardware, or may be implemented by a processor by executing software instructions. The software instructions may include corresponding software modules. The software modules may be stored in a memory, a flash, a read-only memory, a register, a hard disk, a removable hard disk, an optical disc, or any storage medium in another form that is well known in the art. For example, a storage medium is coupled to a processor, so that the processor can read information from the storage medium or write information into the storage medium. The storage medium may be a component of the processor. The processor and the storage medium may be located in an ASIC. In addition, the ASIC may be located in user equipment. The processor and the storage medium may exist in the user equipment as discrete components.

A person skilled in the art should be aware that in the foregoing one or more examples, functions described in the present disclosure may be implemented by hardware, software, firmware, or any combination thereof. When being implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of the present disclosure are further described in detail in the foregoing specific implementations. It should be understood that, the foregoing descriptions are merely specific embodiments of the present invention, but are not intended to limit the protection scope of the present disclosure. Any modification, equivalent replacement, or improvement made based on the technical solutions of the present disclosure shall fall within the protection scope of the present disclosure.

What is claimed is:

1. A method in a user equipment, comprising:
  receiving a request sent by a network-side device for the user equipment to send downlink interference information to the network-side device;
  in response to receiving the request, obtaining first downlink interference information of a downlink channel of the network-side device; and
  sending a plurality of uplink measurement reference signals to the network-side device, further including:
  sending a first uplink measurement reference signal to the network-side device, wherein the plurality of uplink measurement reference signals includes the first uplink measurement reference signal;
  beamforming the first uplink measurement reference signal by using the first downlink interference information;
  sending, to the network-side device, the first uplink measurement reference signal beamformed by using the first downlink interference information, wherein the first uplink measurement reference signal carries the first downlink interference information; and
  sending a second uplink measurement reference signal to the network-side device for downlink interference estimation on the plurality of uplink measurement reference signals, wherein the plurality of uplink measurement reference signals further comprises a second uplink measurement reference signal beamformed by using a beamforming matrix V and the beamformed second uplink measurement reference signal further beamformed using second downlink interference information, and wherein
  the plurality of uplink measurement reference signals is configured such that performing downlink interference estimation on the second uplink measurement reference signal comprises:
  performing channel estimation on the second uplink measurement reference signal beamformed by using the beamforming matrix V, to obtain a product H*V of an uplink channel matrix H and the beamforming matrix V;
  performing channel estimation on the further beamformed second uplink measurement reference signal, to obtain a product of the uplink channel matrix H, the beamforming matrix V and the second downlink interference information; and
  obtaining the second downlink interference information based on H*V and a product of H*V and the second downlink interference information.

2. The method according to claim 1, wherein sending the plurality of uplink measurement reference signals to the network-side device further comprises:
  sending, to the network-side device, a third uplink measurement reference signal beamformed by using a beamforming matrix V, wherein the plurality of uplink measurement reference signals includes the third uplink measurement reference signal;
  secondarily beamforming, by using third downlink interference information, the third uplink measurement reference signal beamformed using the beamforming matrix V; and
  sending the secondarily beamformed third uplink measurement reference signal to the network-side device.

3. The method according to claim 2, further comprising:
  receiving, codebook information sent by the network-side device, and obtaining the beamforming matrix V based on the codebook information.

4. The method according to claim 2, further comprising:
  receiving a second instruction message sent by the network-side device, wherein the instruction message is used to instruct the user equipment to send the third uplink measurement reference signal beamformed using the beamforming matrix V and the secondarily beamformed third uplink measurement reference signal.

5. The method according to claim 1, wherein
  the user equipment sends, by using a same time domain resource or adjacent time domain resources, the first uplink measurement reference signal and the first uplink measurement reference signal beamformed by using the first downlink interference information; or
  the user equipment sends, by using a same frequency domain resource or adjacent frequency domain resources, the first uplink measurement reference signal and the first uplink measurement reference signal beamformed by using the first downlink interference information; or
  the user equipment sends, by using a same cyclic shift or different cyclic shifts, the first uplink measurement reference signal and the first uplink measurement reference signal beamformed by using the first downlink interference information.

6. A method in a network-side-device for transmitting an uplink measurement reference signal, comprising:
sending a request to a user equipment for sending downlink interference information;
receiving a plurality of uplink measurement reference signals sent by the user equipment, wherein the plurality of uplink measurement reference signals carry downlink interference information of a downlink channel of the network-side device; and
performing downlink interference estimation on the plurality of uplink measurement reference signals, to obtain the downlink interference information,
wherein the plurality of uplink measurement reference signals comprises a first uplink measurement reference signal and the first uplink measurement reference signal beamformed using first downlink interference information, and
wherein the plurality of uplink measurement reference signals further comprises a second uplink measurement reference signal beamformed by using a beamforming matrix V and the beamformed second uplink measurement reference signal further beamformed using second downlink interference information and wherein
the performing downlink interference estimation on the second uplink measurement reference signal comprises:
performing channel estimation on the second uplink measurement reference signal beamformed by using the beamforming matrix V to obtain a product H*V of an uplink channel matrix H and the beamforming matrix V;
performing channel estimation on the further beamformed second uplink measurement reference signal, to obtain a product of the uplink channel matrix H, the beamforming matrix V and the second downlink interference information; and
obtaining the second downlink interference information based on H*V and a product of H*V and the second downlink interference information.

7. The method according to claim 6, wherein
performing downlink interference estimation on the first uplink measurement reference signal, to obtain the first downlink interference information comprises:
performing channel estimation on the first uplink measurement reference signal, to obtain an uplink channel matrix H;
performing channel estimation on the first uplink measurement reference signal beamformed by using the first downlink interference information, to obtain a product H*I of the uplink channel matrix H and the first downlink interference information I; and
obtaining the first downlink interference information based on the uplink channel matrix H and the product H*I.

8. The method according to claim 6, further comprising:
sending an instruction message to the user equipment, wherein the instruction message is used to instruct the user equipment to send the downlink interference information to the network-side device.

9. The method according to claim 8, wherein the instruction message sent by the network-side device is uplink measurement reference signal scheduling signaling.

10. A user equipment, comprising:
a processor, configured to
receive a request sent by a network-side device for the user equipment to send downlink interference information to the network-side device;
in response to receiving the request, obtain first downlink interference information of a downlink channel of a network-side device; and
a transceiver, configured to send a plurality of uplink measurement reference signals to the network-side device, wherein the transceiver is further configured to:
send a first uplink measurement reference signal to the network-side device, wherein the plurality of uplink measurement reference signals includes the first uplink measurement reference signal;
beamform the first uplink measurement reference signal by using the first downlink interference information;
send, to the network-side device, the first uplink measurement reference signal beamformed by using the first downlink interference information, wherein the first uplink measurement reference signal carries the first downlink interference information; and
send a second uplink measurement reference signal to the network-side device for downlink interference estimation on the plurality of uplink measurement reference signals, wherein the plurality of uplink measurement reference signals further comprises a second uplink measurement reference signal beamformed by using a beamforming matrix V and the beamformed second uplink measurement reference signal further beamformed using second downlink interference information, and wherein
the plurality of uplink measurement reference signals is configured such that performing downlink interference estimation on the second uplink measurement reference signal comprises:
performing channel estimation on the second uplink measurement reference signal beamformed by using the beamforming matrix V, to obtain a product H*V of an uplink channel matrix H and the beamforming matrix V,
performing channel estimation on the further beamformed second uplink measurement reference signal, to obtain a product of the uplink channel matrix H, the beamforming matrix V and the second downlink interference information; and
obtaining the second downlink interference information based on H*V and a product of H*V and the second downlink interference information.

11. The user equipment according to claim 10, wherein to send the plurality of uplink measurement reference signals to the network-side device, the transceiver is configured to:
send, to the network-side device, a third uplink measurement reference signal beamformed by using a beamforming matrix V;
secondarily beamform, by using third downlink interference information, the third uplink measurement reference signal beamformed by using the beamforming matrix V, wherein the plurality of uplink measurement reference signals includes the third uplink measurement reference signal; and
send the secondarily beamformed third uplink measurement reference signal to the network-side device.

12. The user equipment according to claim 11, wherein the transceiver is further configured to: receive codebook information sent by the network-side device, and to obtain the beamforming matrix V based on the codebook information.

13. The user equipment according to claim 10, wherein the transceiver is configured to:
- send, by using a same time domain resource or adjacent time domain resources, the first uplink measurement reference signal and the first uplink measurement reference signal beamformed by using the first downlink interference information; or
- send, by using a same frequency domain resource or adjacent frequency domain resources, the first uplink measurement reference signal and the first uplink measurement reference signal beamformed by using the first downlink interference information; or
- send, by using a same cyclic shift or adjacent cyclic shifts, the first uplink measurement reference signal and the first uplink measurement reference signal beamformed by using the first downlink interference information.

\* \* \* \* \*